United States Patent
Hunt et al.

(10) Patent No.: US 12,256,671 B2
(45) Date of Patent: Mar. 25, 2025

(54) AGRICULTURAL SYSTEM AND METHOD FOR AUTOMATICALLY CONTROLLING A POSITION OF A HARVESTING IMPLEMENT OF AN AGRICULTURAL HARVESTER

(71) Applicant: CNH Industrial America LLC, New Holland, PA (US)

(72) Inventors: Cory Douglas Hunt, Millersville, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 936 days.

(21) Appl. No.: 17/324,654

(22) Filed: May 19, 2021

(65) Prior Publication Data

US 2022/0369557 A1  Nov. 24, 2022

(51) Int. Cl.
*A01D 41/14* (2006.01)
*A01D 41/127* (2006.01)

(52) U.S. Cl.
CPC ....... *A01D 41/141* (2013.01); *A01D 41/1274* (2013.01); *A01D 41/145* (2013.01)

(58) Field of Classification Search
None
See application file for complete search history.

(56) References Cited

U.S. PATENT DOCUMENTS

| | | | |
|---|---|---|---|
| 5,359,836 A * | 11/1994 | Zeuner ................. | A01D 41/141 56/208 |
| 10,101,152 B1 | 10/2018 | Williams | |
| 2004/0216437 A1 * | 11/2004 | Erdmann ............. | A01D 41/144 56/10.1 |
| 2014/0324291 A1 | 10/2014 | Jones et al. | |
| 2017/0107700 A1 * | 4/2017 | Faivre .................... | E02F 3/847 |
| 2017/0245434 A1 | 8/2017 | Jung et al. | |
| 2018/0022402 A1 | 1/2018 | Hamilton et al. | |
| 2018/0024252 A1 | 1/2018 | Vogler et al. | |

(Continued)

FOREIGN PATENT DOCUMENTS

WO   WO 2019178299 A1   9/2019

OTHER PUBLICATIONS

Extended European Search Report for EP application 22173623.4 dated Oct. 24, 2022 (8 pages).

*Primary Examiner* — Anshul Sood
(74) *Attorney, Agent, or Firm* — Peter K. Zacharias

(57) ABSTRACT

An agricultural method for automatically controlling a position of a harvesting implement of an agricultural harvester, where the harvesting implement may be movably supported relative to a chassis of the agricultural harvester, and where a cab may be movably supported relative to the chassis, may include receiving inertial movement data from an implement-based inertial measurement unit (IMU) supported on the harvesting implement and inertial movement data from a vehicle-based IMU supported on at least one of the cab or the chassis of the agricultural harvester. The method may further include determining a relative movement parameter of the harvesting implement relative to the at least one of the cab or the chassis based at least in part on the inertial movement data. Additionally, the method may include controlling an operation of an implement actuator based at least in part on the relative movement parameter.

17 Claims, 5 Drawing Sheets

(56) References Cited

U.S. PATENT DOCUMENTS

2019/0265044 A1     8/2019  Keene
2020/0128717 A1     4/2020  Rotole
2020/0359543 A1 *  11/2020  Dix ........................ A01B 63/14

* cited by examiner

AGRICULTURAL SYSTEM AND METHOD FOR AUTOMATICALLY CONTROLLING A POSITION OF A HARVESTING IMPLEMENT OF AN AGRICULTURAL HARVESTER

FIELD OF THE INVENTION

The present disclosure relates generally to harvesting implements for agricultural harvesters and, more particularly, to agricultural systems and methods for automatically controlling a position of a harvesting implement based at least in part on inertial measurement data.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing.

Conventionally, the operation of most harvesters requires substantial operational involvement and control by the operator. For example, with reference to a combine, the operator is typically required to control various operating parameters, such as the direction of the combine, the speed of the combine, the height of the combine header, the air flow through the combine cleaning fan, the amount of harvested crop stored on the combine, and/or the like. To address such issues, many current combines utilize an automatic header height control system that attempts to maintain a constant cutting height above the ground regardless of the ground contour or ground position relative to the base harvester. For instance, it is known to utilize electronically controlled height and tilt actuators to automatically adjust the height, fore-to-aft tilt, and lateral tilt of the header based on a height or distance between the header and the ground and/or sensor measurements received from a plurality of sensors. For example, one or more rotation sensors at linkages between the header and the chassis and/or in-cylinder pressure sensors of the cylinder actuators for adjusting the height, fore-to-aft tilt, and lateral tilt of the header relative to the chassis have been used to detect the height, fore-to-aft tilt, and/or lateral tilt of the header relative to the chassis, where the position of the header relative to the chassis may be automatically adjusted according to the distance between the header and the ground. However, the sensor measurements may require periodic re-calibration, which is time consuming. Further, the automatic adjustment of the header may create unwanted movement or vibration in other areas of the harvester.

Accordingly, an improved agricultural system and method for automatically controlling a position of a harvesting implement of an agricultural harvester would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural method for automatically controlling a position of a harvesting implement of an agricultural harvester, where the harvesting implement is movably supported relative to a chassis of the agricultural harvester, and where the agricultural harvester has a cab movably supported relative to the chassis. The method includes receiving, with a computing system, inertial movement data from an implement-based inertial measurement unit (IMU) supported on the harvesting implement. The method further includes receiving, with the computing system, inertial movement data from a vehicle-based IMU supported on at least one of the cab or the chassis of the agricultural harvester. Moreover, the method includes determining, with the computing system, a relative movement parameter of the harvesting implement relative to the at least one of the cab or the chassis based at least in part on the inertial movement data from the implement-based and vehicle-based IMUs. Additionally, the method includes controlling, with the computing system, an operation of an implement actuator based at least in part on the relative movement parameter.

In another aspect, the present subject matter is directed to an agricultural system for automatically controlling a position of a harvesting implement of an agricultural harvester. The system includes a chassis, a cab supported relative to the chassis, and a harvesting implement movably supported relative to the chassis. The system further includes an implement-based inertial measurement unit (IMU) supported on the harvesting implement, with the implement-based IMU being configured to generate inertial movement data associated with the harvesting implement. Similarly, the system includes a vehicle-based IMU supported on at least one of the cab or the chassis of the agricultural harvester, with the vehicle-based IMU being configured to generate inertial movement data associated with the at least one of the cab or the chassis. Moreover, the system includes an implement actuator configured to control movement of the harvesting implement. Additionally, the system includes a computing system communicatively coupled to the implement-based IMU, the vehicle-based IMU, and the implement actuator. The computing system is configured to receive the inertial movement data from the implement-based and the vehicle-based IMUs, determine a relative movement parameter of the harvesting implement relative to the at least one of the cab or the chassis based at least in part on the inertial movement data from the implement-based and vehicle-based IMUs, and control an operation of the implement actuator based at least in part on the relative movement parameter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
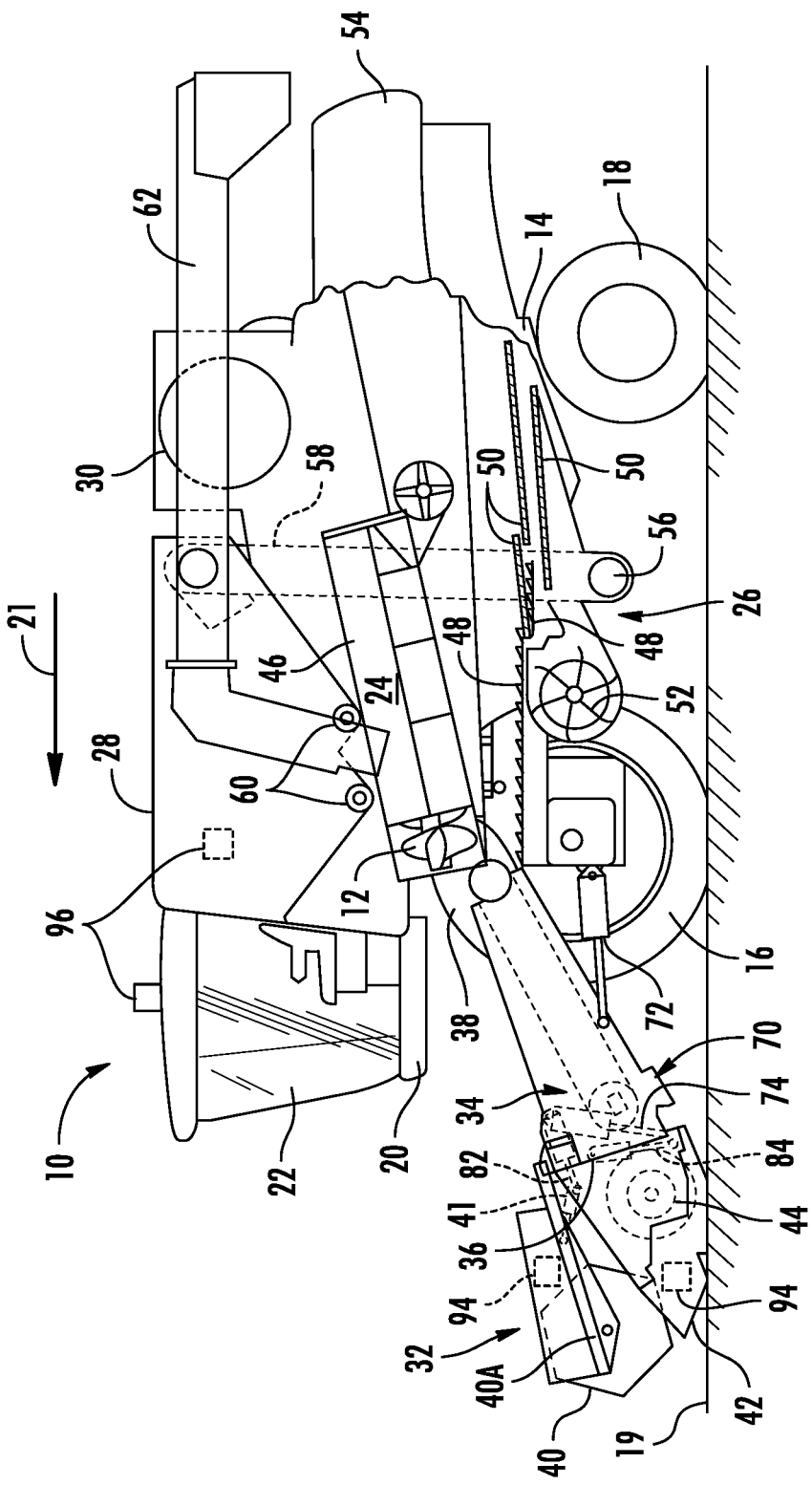
FIG. 1 illustrates a simplified, partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for automatically controlling a position of a harvesting implement of an agricultural harvester. Typically, the height and tilt of a harvesting implement, such as a header, of an agricultural harvester is controlled according to the distance between the header and a surface of the field. However, the movement of the harvesting implement may cause unwanted movement or vibrations at other areas of the agricultural harvester, such as at the cab or the chassis. Further, the position of the harvesting implement relative to the main vehicle (e.g., the cab or chassis of the agricultural harvester) may be adjusted in response to the distance between the harvesting implement and the field according to a known relationship. Typically, when the harvesting implement is a header supported relative to a chassis of the harvester, one or more rotational sensors at linkages between the header and the chassis and/or one or more pressure sensors within the actuating cylinders for adjusting the height and/or tilt of the header relative to the chassis may be used to detect a height of the header relative to the chassis, a fore-to-aft tilt of the header relative to the chassis, and/or a lateral tilt of the header relative to the chassis. However, each sensor requires periodic calibration, which can be time consuming.

Thus, in accordance with aspects of the present subject matter, an implement-based inertial measurement unit (IMU) may be supported on the harvesting implement to generate inertial movement data associated with the harvesting implement, and a vehicle-based inertial measurement unit (IMU) may be supported on the main vehicle of the agricultural harvester to generate inertial movement data associated with the main vehicle. Based on the inertial movement data collected from both the implement-based and vehicle-based IMUs, the acceleration of the harvesting implement relative to the main vehicle of the harvester and/or the position of the harvesting implement relative to the main vehicle of the harvester may be determined with fewer calibrations and higher accuracy. Then, the operation of an implement actuator may be controlled based at least in part on the relative acceleration and/or position. For instance, if the relative acceleration determined based on the IMU data is too high, a lift and/or tilt actuator may be controlled according to a reduced gain, and/or a stabilization actuator may be controlled to reduce such relative acceleration. Similarly, a lift and/or tilt actuator may be controlled according to the relative position more accurately.

Referring now to the drawings, FIG. 1 illustrates a simplified, partial sectional side view of one embodiment of a work vehicle, such as an agricultural harvester 10. The harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of movement (indicated by arrow 21 in FIG. 1) relative to the ground surface 19. Additionally, an operator's platform 20 with an operator's cab 22, a threshing and separating assembly 24, a grain cleaning assembly 26 and a holding tank 28 may be supported by the frame 14. Additionally, as is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotably secured thereto for generally vertical movement. In general, the feeder 34 may be configured to serve as support structure for the header 32. As shown in FIG. 1, the feeder 34 may extend between a front end 36 rotationally coupled to the header 32 and a rear end 38 positioned adjacent to the threshing and separating assembly 24. As is generally understood, the rear end 38 of the feeder 34 may be pivotably coupled to a portion of the harvester 10 to allow the front end 36 of the feeder 34 and, thus, the header 32 to be moved upwardly and downwardly relative to the ground surface 19 to set the desired harvesting or cutting height for the header 32.

In some embodiments, the header 32 includes a reel 40 rotatably coupled to a reel frame 40A which is, in turn, rotatably coupled to a frame of the header 32. The reel 40 is generally configured to contact crop material before a sickle bar 42 of the header 32. For instance, the reel 40 may include tines and/or the like such that, when crop materials contact the reel 40, the crop materials may be oriented into a substantially uniform direction and guided toward the sickle bar 42. The vertical positioning of the reel 40 (e.g., relative to the ground and/or chassis 22) may be adjusted by a reel actuator 41 coupled between the reel frame 40A and the feeder 34. For instance, the reel actuator 41 may be a cylinder which is extendable and retractable to adjust a vertical position of the reel 40.

As the harvester 10 is propelled forwardly over a field with standing crop, the crop material is directed towards the sickle bar 42 by the reel 40. the crop material is severed from the stubble by a sickle bar 42 at the front of the header 32 and delivered by a header auger 44 to the front end 36 of the feeder 34, which supplies the cut crop to the threshing and separating assembly 24. As is generally understood, the threshing and separating assembly 24 may include a cylindrical chamber 46 in which the rotor 12 is rotated to thresh and separate the crop received therein. That is, the crop is rubbed and beaten between the rotor 12 and the inner surfaces of the chamber 46, whereby the grain, seed, or the like, is loosened and separated from the straw.

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a header adjusting system 70 (e.g., a hydraulic system) which is configured to adjust a height of the header 32 relative to the ground surface 19 so as to maintain the desired cutting height between the header 32 and the ground surface 19. The header adjusting system 70 may include a height actuator 72 configured to adjust the height or vertical positioning of the header 32 relative to the ground. For example, in some embodiments, the height actuator 72 may be coupled between the feeder 34 and the frame 14 such that the height actuator 72 may pivot the feeder 34 to raise and lower the header 32 relative to the ground surface 19. Further, the header adjusting system 70 may include a lateral tilt actuator(s) 74 coupled between the header 32 and the feeder 34 to allow the header 32 to be tilted relative to the ground surface 19 or pivoted laterally or side-to-side relative to the feeder 34. Moreover, the header adjusting system 70 may include a fore-to-aft actuator(s) 82 coupled between the header 32 and the feeder 34 to allow the header 32 to be tilted in a fore-to-aft direction relative to the ground surface 19 or forward and backward relative to the feeder 34. Additionally, the header adjusting system 70 may include a stabilization actuator(s) 84 between the header 32 and the feeder 34 to reduce rotation of the header 32 in an opposite direction from the desired actuation direction of the fore-to-aft actuator(s) 82.

Figure 2:
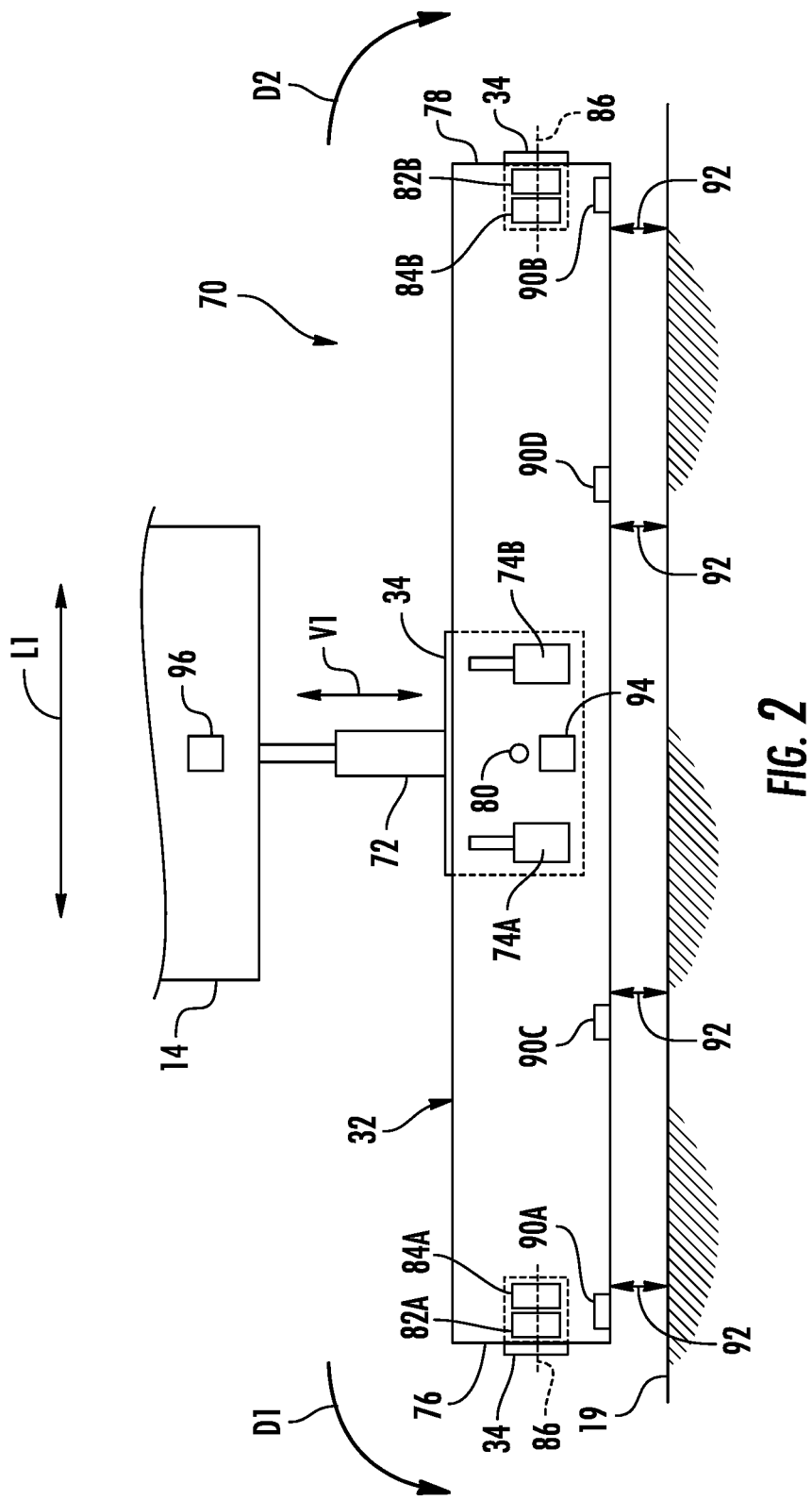
FIG. 2 illustrates a simplified, schematic view of one embodiment of a harvesting attachment and related hydraulic system for an agricultural harvester in accordance with aspects of the present subject matter.

Referring now to FIG. 2, a simplified, schematic view of one embodiment of the header 32 and associated header adjusting system 70 described above with reference to FIG. 1 is illustrated in accordance with aspects of the present subject matter. As indicated above, the height actuator 72 may, for instance, be configured to raise and lower the end of the feeder 34 coupled to the header 32 relative to the frame 14 of the harvester, thereby adjusting the vertical positioning of the header 32 in the vertical direction indicated by arrow V1 (e.g., along a lateral centerline of the feeder 34). For instance, the height actuator 72 may be a cylinder configured to extend and retract to raise and lower the header 32 along the vertical direction V1. However, in other embodiments, the height actuator 72 may be any other suitable type and/or include any suitable number of actuators.

As shown, the header 32 may generally extend side-to-side or in a lateral direction (indicated by arrow L1 in FIG. 2) between a first lateral end 76 and a second lateral end 78. The header 32 may be pivotably coupled to the feeder 34 at one or more locations between its first and second lateral ends 76, 78 to allow the header 32 to tilt laterally relative to the feeder 34 (e.g., in the tilt directions indicated by arrows D1, D2 in FIG. 2) about a lateral tilt axis 80, where the lateral tilt axis 80 is generally aligned with a lateral centerline of the header 32 and extends generally parallel to the direction of movement 21. As indicated above, the header adjusting system 70 may include one or more lateral tilt actuators 74. For instance, as shown in FIG. 2, a first lateral tilt actuator 74A may be coupled between the header 32 and the feeder 34 along one lateral side of the connection between the header 32 and the feeder 34, and a second lateral tilt actuator 74B may be coupled between the header 32 and the feeder 34 along the opposed lateral side of the connection between the header 32 and the feeder 34. In such an embodiment, the lateral tilt actuators 74A, 7B may be configured to pivot or tilt the header 32 about the lateral tilt axis 80 of the header 32. For instance, the lateral tilt actuators 74A, 74B may be cylinders configured to extend and retract to pivot or tilt the header 32 about the lateral tilt axis 80. However, in other embodiments, the lateral tilt actuators 74A, 74B may be any other suitable type and/or include any suitable number of actuators.

Further, as indicated above, the header adjusting system 70 may include one or more fore-to-aft actuator(s) 82. For instance, a first fore-to-aft actuator 82A may be coupled between the header 32 and the feeder 34 along one lateral side of the header 32, and a second fore-to-aft actuator 82B may be coupled between the header 32 and the feeder 34 along the opposed lateral side of the header 32. In such an embodiment, the fore-to-aft actuators 82A, 82B may be configured to pivot or tilt the header 32 relative to the feeder 34 about a fore-to-aft tilt axis 86 extending generally parallel to the lateral direction. For instance, the fore-to-aft actuators 82A, 82B may be cylinders configured to extend and retract to pivot or tilt the header 32 about the fore-to-aft tilt axis 86. It should be appreciated that the first and second fore-to-aft cylinders 82A, 82B are each shown schematically with a simple box in FIG. 2. However, it should be appreciated that, in other embodiments, the fore-to-aft actuators 82A, 82B may be any other suitable type and/or include any suitable number of actuators.

In some embodiments, as indicated above, the header adjusting system 70 may further include one or more stabilization actuators 84. For instance, a first stabilization actuator 84A may be coupled between the header 32 and the feeder 34 along one lateral side of the header 32, and a second stabilization actuator 84B may be coupled between the header 32 and the feeder 34 along the opposed lateral side of the header 32. In such an embodiment, the stabilization actuators 84A, 84B may be used to reduce, slow down, or prevent rotation of the header 32 about the fore-to-aft tilt axis 86 in an opposite direction from the desired actuation direction of the fore-to-aft actuator(s) 82, such as in response to traveling over uneven ground or changing ground speeds. For instance, the stabilization actuators 84A, 84B may be adjustable cylinders configured to prevent, slow down, or reduce unwanted pivot or tilt of the header 32 about the fore-to-aft tilt axis 86. It should be appreciated that the first and second stabilization cylinders 84A, 84B are each shown schematically with a simple box in FIG. 2. It should be further appreciated that, in other embodiments, the stabilization actuators 84A, 84B may be any other suitable type and/or include any suitable number of actuators.

In general, the operation of the height actuator 72, the lateral tilt actuator(s) 74, the fore-to-aft tilt actuator(s) 82, and/or the stabilization actuator(s) 84 may be controlled (e.g., via an associated controller) to adjust the vertical positioning and tilt angle of the header 32 relative to the ground surface 19 and/or the chassis 14 or cab 22. For instance, a plurality of height sensors 90 may be provided on the header 32 to monitor one or more respective local distances or heights 92 defined between the header 32 and the ground surface 19. Specifically, as shown in FIG. 2, the header 32 includes four height sensors 90 supported thereon for monitoring the local height 92 relative to the ground surface 19, such as by including a first height sensor 90A positioned adjacent to the first lateral end 76 of the header 32, a second height sensor 90B positioned adjacent to the second lateral end 78 of the header 32, and third and fourth height sensors 90C, 90D positioned between the first and second height sensors 90A, 90B along either side of the header centerline. In the illustrated embodiment, the height sensors 90 are spaced apart equally along the lateral width of the header 32. However, in other embodiments, the lateral spacing between the various height sensors 90 may be non-uniform or varied. It should also be appreciated that, although the header 32 is illustrated herein as including four height sensors 90, any number of height sensors 90 may be installed relative to the header 32 to provide an indication of the local height 92 defined between the header 32 and the ground surface 19 at a corresponding number of lateral sensor positions spaced apart across the width of the header 32. It should additionally be appreciated that, while not shown, the height sensors 90 may similarly be installed on the reel 40 (FIG. 1) of the header 32.

It should be appreciated that each height sensor 90 may generally correspond to any suitable sensing device configured to provide sensor data indicative of the local height or distance 92 defined between the header 32 and the ground surface 19 at the installed location of such sensor 90. In the illustrated embodiment, the height sensors 90 comprise non-contact height sensors, such as laser sensors, radar sensors, ultrasonic sensors, and/or the like. Alternatively, the height sensors 90 may comprise contact-based or mechanical height sensors. For instance, in one embodiment, the height sensors 90 may be coupled to mechanical feelers or pivot arms that are configured to contact the ground and pivot up/down with changes in the ground contour, thereby allowing the sensors 90 to detect variations in the local height 92.

Figure 3:
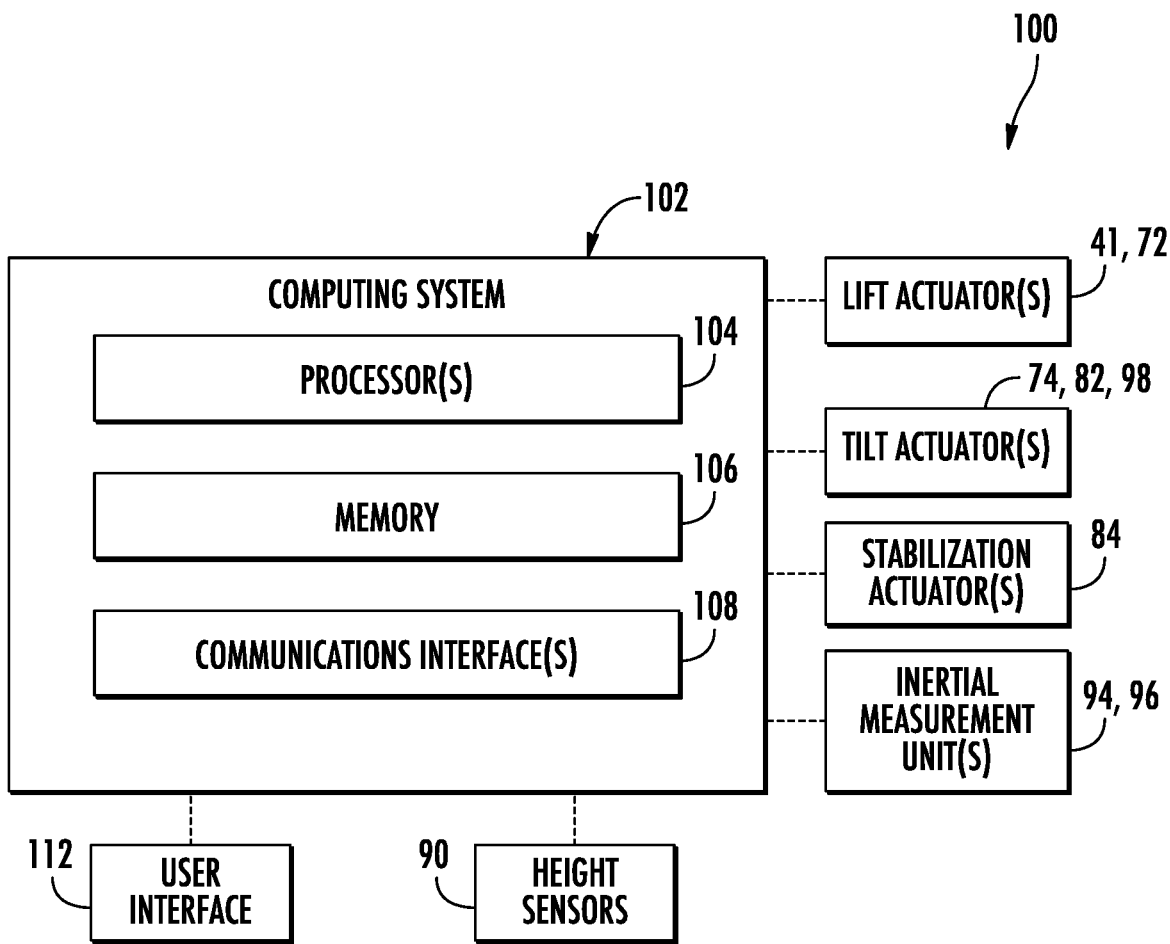
FIG. 3 illustrates a schematic view of one embodiment of a system for automatically controlling a position of a harvesting implement of an agricultural harvester in accordance with aspects of the present subject matter.

In general, the height data provided by the various height sensors 90 may be used as a control input for controlling the operation of the actuators 41, 72, 74, 82, 98 (FIG. 3). Specifically, in accordance with aspects of the present subject matter, the height data may be analyzed in combination with the known spatial relationship between the sensors 90 and the header 32 to determine a single control variable for controlling the operation of the actuators 41, 72, 74 82, 98. However, the control of the actuators 41, 72, 74, 82, 98 for moving the header 32 may cause unwanted movement or vibration elsewhere on the agricultural harvester 10. Further, the relative position of the header 32 to the chassis 14 (or cab 22) used for adjusting the position of the header 32 is typically determined based on a plurality of rotation and/or pressure sensors, usually one sensor for each direction of movement (e.g., a sensor for vertical movement, a sensor for lateral tilt, and a sensor for fore-to-aft tilt), which require time-consuming, periodic calibration to ensure correct measurements.

Thus, in accordance with aspects of the present subject matter, an implement-based inertial measurement unit 94 (hereinafter referred to as "implement-based IMU 94") and a vehicle-based inertial measurement unit 96 (hereinafter referred to as "vehicle-based IMU 96") may be used to determine a relative movement parameter of the header 32 relative to at least one of the chassis 14 or the cab 22. The relative movement parameter may, in turn, be used to monitor reactive accelerations of the agricultural harvester 10 and/or to monitor the actual position of the header 32 relative to the chassis 14 (or cab 22) more easily and accurately. The IMUs 94, 96 may be configured as a combination of accelerometers, gyroscopes, and magnetometers for generating inertial measurement data indicative of at least acceleration (linear and rotational) and position information in each of three principle axes (x-axis, y-axis, z-axis) of a global reference frame for the respective component of the agricultural harvester 10. Particularly, the implement-based IMU(s) 94 may be configured to generate inertial measurement data of the header 32, which can include inertial measurement data of any header portions that are independently movable relative to other header components of the header 32 (e.g., reel 40), while the vehicle-based IMU(s) 96 may be configured to generate inertial measurement data of the chassis 14 or the cab 22. By comparing the inertial measurement data from the IMUs 94, 96 the relative acceleration and position between the header 32 and the chassis 14 and/or the cab 22 may be determined, which may be used to improve the control of the movements of the header 32, as will be described below in greater detail.

It should be appreciated that, while the header 32 is shown as having only one section, in some embodiments, the header 32 may be configured as a multi-section header having multiple sections, such as one or more central frame sections (configured substantially similarly to the disclosed header 32) and at least one wing frame section (not shown). For example, in one embodiment, a first lateral side of an inner wing frame section may be pivotably coupled to a lateral side 76, 78 of one of the central frame sections 32 such that the inner wing frame section is pivotable relative to the central frame section 32 to adjust a height of an opposed, second lateral side of the inner wing frame section relative to the ground surface 19. Further, in some embodiments, a first lateral side of an outer wing frame section (not shown) may be pivotably coupled to the second lateral side of the inner wing frame section such that the outer wing frame section is pivotable relative to the inner wing frame section to adjust a height of an opposed, second lateral side of the outer wing frame section relative to the ground surface 19. In such embodiments, one or more wing actuators 98 (FIG. 3) may be provided and controlled to pivot the inner wing frame section relative to the respective central frame section 32 and/or to pivot the outer wing frame section relative to the respective inner wing frame section. As the multiple frame sections are movable relative to each other, in some embodiments, a height sensor 90 and/or an implement-based IMU 94 may be positioned on one or more of the header sections, including providing such sensor(s) on each of the header sections.

Referring now to FIG. 3, a schematic view of one embodiment of an agricultural system 100 for automatically controlling a position of a harvesting implement of an agricultural harvester (such as the header 32 of the harvester 10 described above) is illustrated in accordance with aspects of the present subject matter. In general, the agricultural system 100 will be described herein with reference to the harvester 10 and header 32 illustrated in FIGS. 1 and 2. However, it should be appreciated that the disclosed agricultural system 100 may be used with any suitable harvesting implement having any suitable implement configuration and/or with any suitable agricultural work vehicle having any other suitable vehicle configuration consistent with the disclosure provided herein.

In several embodiments, the agricultural system 100 may include a computing system 102 and various components, features, systems and/or sub-systems configured to be communicatively coupled to the computing system 102. In general, the computing system 102 may be configured to perform various computer-related functions or tasks, including, for example, receiving data from one or more components, features, systems and/or sub-systems of the agricultural harvester 10, storing and/or processing data received or generated by the computing system 102, and/or controlling the operation of one or more components, features, systems and/or sub-systems of the agricultural harvester 10.

In general, the computing system 102 may correspond to any suitable processor-based device(s), such as a computing device or any combination of computing devices. Thus, as shown in FIG. 3, the computing system 102 may generally include one or more processor(s) 104 and associated memory devices 106 configured to perform a variety of computer-implemented functions (e.g., performing the methods, steps, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device 106 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device 106 may generally be configured to store information accessible to the processor(s) 104, including data that can be retrieved, manipulated, created and/or stored by the processor(s) 104 and instructions that can be executed by the processor(s) 104.

As further shown in FIG. 3, the computing system 102 is configured to be communicatively coupled to the various actuators for controlling movement of the header 32 of the agricultural harvester 10, such as the lift actuator(s) 41, 72, the tilt actuator(s) 74, 82, 98 and the stabilization actuator(s) 84. As such, the computing system 102 may be configured to control an operation of the actuator(s) 41, 72, 74, 82, 84, 98 to adjust the movement of the header 32 or at least a portion of the header 32, such as the reel 40. Further the computing system 102 is configured to be communicatively coupled to the IMUs 94, 96. As such, the computing system 102 may be configured to receive inertial measurement data from the IMUs 94, 96 indicative of at least the acceleration and/or the position of the header 32 and the acceleration and/or the position of the chassis 14 and/or cab 22, respectively. Moreover, the computing system 102 may be configured to be communicatively coupled to the height sensor (s) 90. As such, the computing system 102 may be configured to receive distance data from the height sensor(s) 90 indicative of the height of the header 32 relative to the ground surface 19. Additionally, the computing system 102 is configured to be communicatively coupled to a user interface 112 of the agricultural harvester 10. As such, the computing system 102 may be configured to receive inputs from the user interface 112 which may indicate a desired or selected height of the header 32 relative to the ground surface 19, and/or to control the operation of the user interface 112 to display information about the height of the header 32 relative to the ground and/or the overall orientation of the header 32.

In some embodiments, the computing system 102 may be configured to include one or more communications modules or interfaces 108 to allow the computing system 102 to communicate with any of the various system components described herein. For instance, one or more communicative links or interfaces (e.g., one or more data buses) may be provided between the communications interface 108 and each of the actuator(s) 41, 72, 74, 82, 84, 98 to allow the computing system 102 to control the operation of the actuator(s) 41, 72, 74, 82, 84, 98. Further, one or more communicative links or interfaces (e.g., one or more data buses) may be provided between the communications interface 108 and the IMUs 94, 96 to allow the computing system 102 to receive the inertial measurement data from the IMUs 94, 96 indicative of the acceleration and/or the position of at least a portion of the header 32, the chassis 14 and/or the cab 22 in global reference or coordinate frame. It should be appreciated that, in some embodiments, the IMUs 94, 96 may alternatively be configured as integral IMUs that are integrated into a housing of the computing system 102 such that the IMUs 94, 96 do not require an external communications interface with the computing system 102. Moreover, one or more communicative links or interfaces (e.g., one or more data buses) may be provided between the communications interface 108 and the height sensor(s) 90 to allow the computing system 102 to receive data indicative of a height of the header 32 relative to the ground surface 19. Additionally, one or more communicative links or interfaces (e.g., one or more data buses) may be provided between the communications interface 108 and the user interface 112 to allow the computing system 102 to receive data indicative of a selected height of the header 32 from the user interface 112 and/or to control the user interface 112 to indicate the selected and/or sensed header height.

As indicated above, the computing system 102 may generally be configured to automatically control the position of the header 32 of the agricultural harvester 10 based at least in part on the height of the header 32 relative to the ground surface 19. For instance, the computing system 102 may receive an input from the user interface 112 indicative of a desired height of the header 32 and an input(s) from the height sensor(s)s 90 indicative of the current height or distance of the header 32 relative to the ground surface 19, compare the current height of the header 32 to the desired height, and subsequently control an operation of the actuator (s) 41, 72, 74, 82, 98 (e.g., valves of the actuator(s) 41, 72, 74, 82, 98) to adjust the movement and/or position of the header 32 based on the comparison of the current and desired heights of the header 32. For example, the computing system 102 may comprise one or more control algorithms stored in its memory 106 configured to output a control signal for controlling an operation of one or more of the actuators 41, 72, 74, 82, 98 based at least in part on the desired height of the header 32 and the sensed height of the header 32 to move the header 32 to the desired height. Such control algorithms may include, for example, closed-loop control algorithms, such as a P, PI, PD, and/or PID control algorithm, that control the operation of the various actuators by calculating an output control signal based on an error between the current and desired heights of the header 32 and any applicable control gains.

However, as indicated above, the movement of the header 32 may cause excessive movement or vibration of another portion of the agricultural harvester 10. Particularly, if the header 32 is moved too quickly, vibrations may be created throughout the chassis 14, which may lead to excess wear on the harvester 10, and/or vibrations may be felt by an operator within the cab 22. As such, in accordance with aspects of the present subject matter, the computing system 102 may be configured to automatically control the movement or position of the header 32 based at least in part on the inertial measurement data received from the implement-based IMU 94 and the vehicle-based IMU 96. For instance, the computing system 102 may be configured to evaluate the inertial measurement data from the IMUs 94, 96 to determine when a vibration of the chassis 14 and/or the cab 22 occurs due to movement of the header 32, and not due to external forces (bumps or potholes in the ground surface 19). Particularly, the computing system 102 may be configured to determine a relative movement parameter of the header 32 by comparing accelerations of the chassis 14 and/or the cab 22 to the accelerations of the header 32 based at least in part on the inertial measurement data to determine when a vibration of the chassis 14 and/or the cab 22 occurs due to movement of the header 32.

Figure 4:
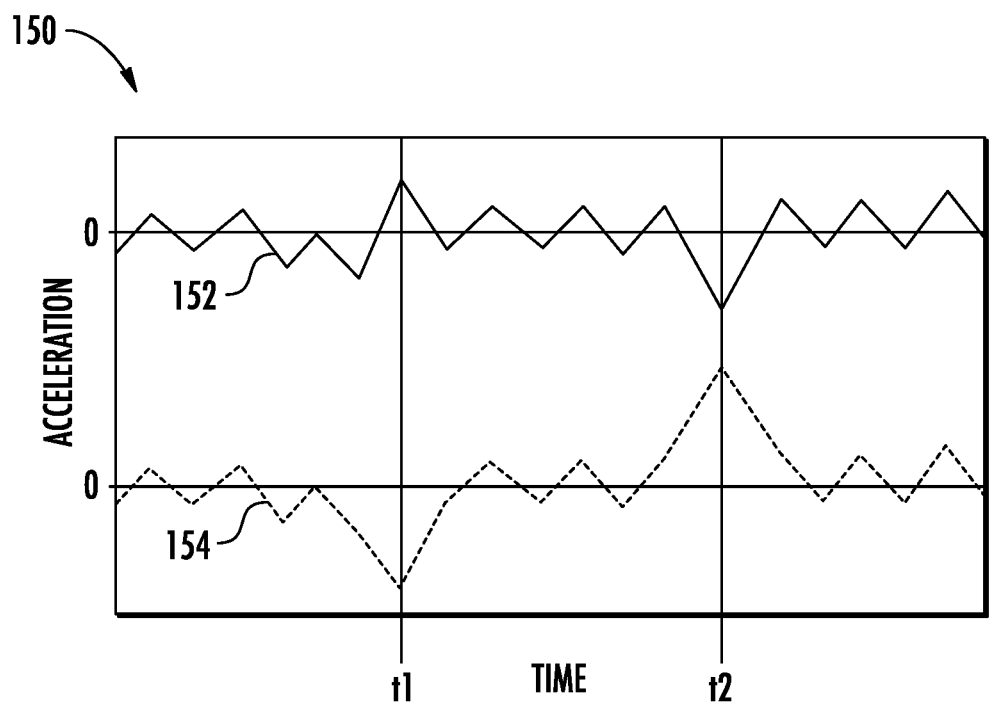
FIG. 4 illustrates inertial measurement data for a harvesting implement and a cab of an agricultural harvester in accordance with aspects of the present subject matter, particularly identifying accelerations of the cab due to movement of the harvesting implement.

For example, as shown in FIG. 4, a graph 150 is provided that illustrates example data associated with the accelerations of the header 32, or at least a portion of the header 32, such as of the reel 40, (as shown by line 152) and a portion of the main vehicle (e.g., the accelerations of the chassis 14 or cab 22) (as shown by line 154) in the vertical direction V1 over time. When the header 32 is not being moved by the actuator(s) 41, 72, the header 32 and the portion of the main vehicle may experience accelerations in the same direction due to changes in the ground surface 19. However, if the header 32 is raised or lowered too quickly, the header 32 may experience a significant acceleration in one direction and the portion of the main vehicle may experience a significant reactive acceleration in the opposite direction. For example, when the header 32 is raised too quickly, at a first time instance t1, the header 32 may experience a significant upward or positive acceleration and the portion of the main vehicle may experience a significant downward or negative reactive acceleration. Conversely, for example, if the header 32 is lowered too quickly, at a second time instance t2, the header 32 may experience a significant downward or negative acceleration and the portion of the main vehicle may experience a significant upward or positive reactive acceleration. It should be appreciated that, in response to pivoting of the header 32 too quickly about the lateral tilt axis 80 and/or the fore-to-aft axis 86, the portion of the main vehicle may also experience a significant reactive acceleration in the opposite direction of acceleration of the header 32.

In some embodiments, once the computing system 102 identifies instances of reactive accelerations of the chassis 14 and/or the cab 22 due to the acceleration of the header 32 in response to control of the lift actuator(s) 41, 72 and/or the tilt actuator(s) 74, 82, 98, the computing system 102 may further determine if an adjustment in the control algorithm for controlling movements of the header 32 is necessary. For instance, in one embodiment, the computing system 102 may compare the reactive accelerations of the main vehicle (e.g., the chassis 14 and/or cab 22) to one or more acceleration thresholds, such as an acceleration magnitude threshold and/or an acceleration frequency threshold. If the magnitude of the reactive acceleration of the main vehicle (e.g., the chassis 14 and/or cab 22) exceeds the acceleration magnitude threshold and/or if the number of reactive accelerations of the main vehicle (e.g., the chassis 14 and/or cab 22) within a certain time period exceeds the acceleration frequency threshold, then the computing system 102 may determine that an adjustment in the control algorithm for controlling movements of the header 32 is necessary.

Particularly, the computing system 102 may adjust a gain of the control algorithm. For example, if the control algorithm is a Proportional (P-only) control algorithm, a Proportional-Integral (PI) control algorithm, a Proportional-Derivative (PD) control algorithm, or a Proportional-Integral-Derivative (PID) control algorithm, the computing system 102 may be configured to adjust the applied control gain (i.e., decrease the control gain) such that the control output causes a slower movement of the header 32. By controlling an operation of the actuator(s) 41, 72, 74, 82, 98 (e.g. valves of the actuator(s) 41, 72, 74, 82, 98) based on the adjusted control gain, the reactive acceleration experienced by the chassis 14 or the cab 22 when moving the header 32 may be reduced in magnitude and/or frequency, which may improve the wear life of the agricultural harvester 10 and the ride comfort for an operator within the cab 22.

It should be appreciated that the computing system 102 may adjust the control gain in any suitable manner. For instance, the computing system 102 may adjust the control gain based at least in part on the magnitude of the accelerations of the main vehicle. For example, a control gain chart may be predetermined and stored in the memory 106 of the computing system that correlates an average magnitude of the accelerations of the main vehicle due to the accelerations of the header 32 to a respective control gain. Alternatively, the computing system 102 may adjust the control gain iteratively by a predetermined interval that is predetermined and stored in the memory 106 of the computing system 102. It should further be appreciated that the acceleration thresholds may be selected in any suitable manner and/or predetermined and stored in the memory 106 of the computing system 102.

Alternatively, or additionally, in some embodiments, the computing system 102 may determine the relative movement parameter of the header 32 by identifying instances of reactive accelerations of the chassis 14 and/or the cab 22 due to the acceleration of the header 32 about the fore-to-aft axis 86 due to traveling over uneven ground or changes in ground speed, such as in between control of the lift actuator(s) 41, 72 and/or the tilt actuator(s) 74, 82, 98. In response to identifying such reactive accelerations, the computing system 102 may control the operation of the stabilization actuator(s) 84 to increase the compensation force. Particularly, the computing system 102 may control the operation of the stabilization actuator(s) 84 to increase the compensation force to reduce rotation of the header 32 relative to the feeder 34, where the increased compensation force may be selected based at least in part on a magnitude of the reactive acceleration of the chassis 14 and/or the cab 22. For instance, a compensation force chart may be predetermined and stored in the memory 106 of the computing system that correlates an average magnitude of the accelerations of the main vehicle due to the accelerations of the header 32 to a respected compensation force. Alternatively, the computing system 102 may adjust the compensation force iteratively by a predetermined interval that is predetermined and stored in the memory 106 of the computing system 102.

As also indicated above, the computing system 102 may be configured to automatically control a position of the header 32 based at least in part on the inertial measurement data received from the implement-based IMU 94 and the vehicle-based IMU 96. For instance, the computing system 102 may be configured to evaluate the inertial measurement data from the IMUs 94, 96 to determine the actual position of the header relative to the chassis 14 and/or the cab 22. Particularly, the computing system 102 may be configured to determine the relative movement parameter by comparing the position of the header 32 within the global reference frame to the position of the chassis 14 and/or the cab 22 within the global reference frame to determine the actual position of the header 32 relative to the chassis 14 and/or the cab 22 for more accurate control of the position of the header 32.

Figure 5:
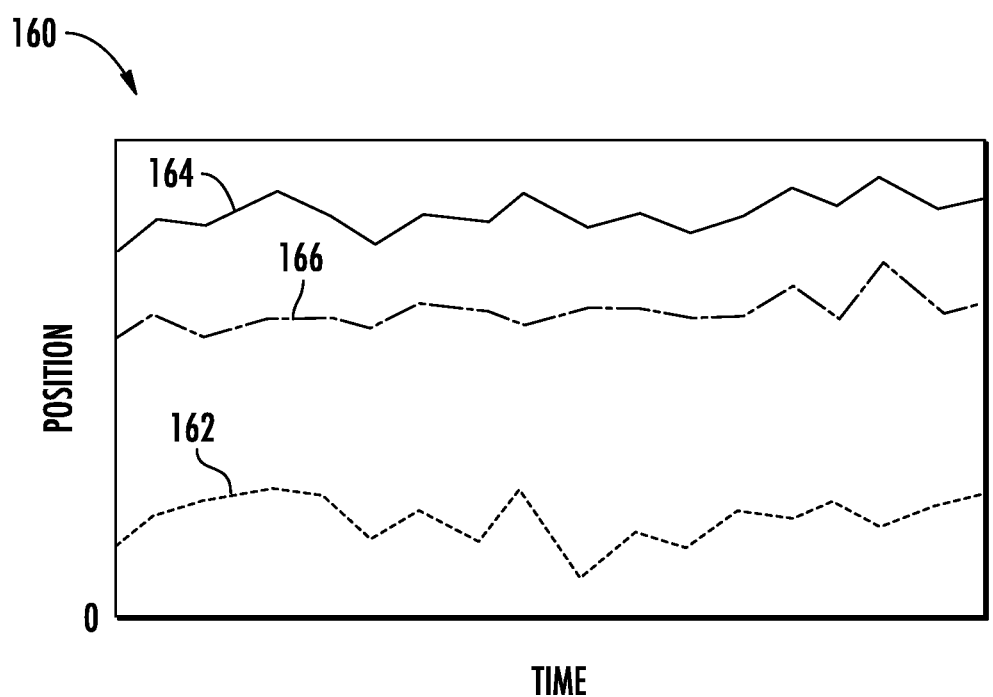
FIG. 5 illustrates inertial measurement data for a harvesting implement and a cab of an agricultural harvester in accordance with aspects of the present subject matter, particularly illustrating a position of the harvesting implement relative to the cab.

For example, as shown in FIG. 5, a graph 160 is provided that illustrates example data associated with the position of the header 32, or at least a portion of the header 32, such as of the reel 40, (as shown by line 162) in one dimension (e.g., the x-dimension, the y-dimension, or the z-dimension) of the global reference frame and the position of a portion of the main vehicle (e.g., the position of the chassis 14 or cab 22) (as shown by line 164) in the same dimension (e.g., the x-dimension, the y-dimension, or the z-dimension) of the global reference frame over time. The position 162 of the header 32 may generally be subtracted from the position 164 of the portion of the main vehicle to determine the position of the header 32 relative to such portion of the main vehicle (as shown by dashed line 166). It should be appreciated that a graph similar to graph 160 may be generated for the positions of the header 32 and the portion of the main vehicle in each dimension (e.g., x-, y-, and z-) of the global reference frame. Once the computing system 102 identifies the position of the header 32 relative to the chassis 14 and/or the cab 22, the computing system 102 may control the operation of the actuator(s) 41, 72, 74, 82, 98 (e.g., valves of the actuator(s) 41, 72, 74, 82, 98) according to the control algorithm more accurately.

It should be appreciated that the inertial measurement data from the implement-based IMU 94 supported on the header 32 and the vehicle-based IMU(s) 96 supported on the cab 22 may be damped, while the inertial measurement data from the vehicle-based IMU(s) 96 supported on the chassis 14 may be undamped. Particularly, the inertial measurement data from the vehicle-based IMU(s) 96 supported on the cab 22 may be damped due to the suspension of the cab 22 relative to the chassis 14. As such, the computing system 102 may be configured to compare the inertial measurement data received from the IMUs 94, 96 based at least in part on the damped or undamped nature of the inertial measurement data corresponding to the location of the IMU 94, 96.

Figure 6:
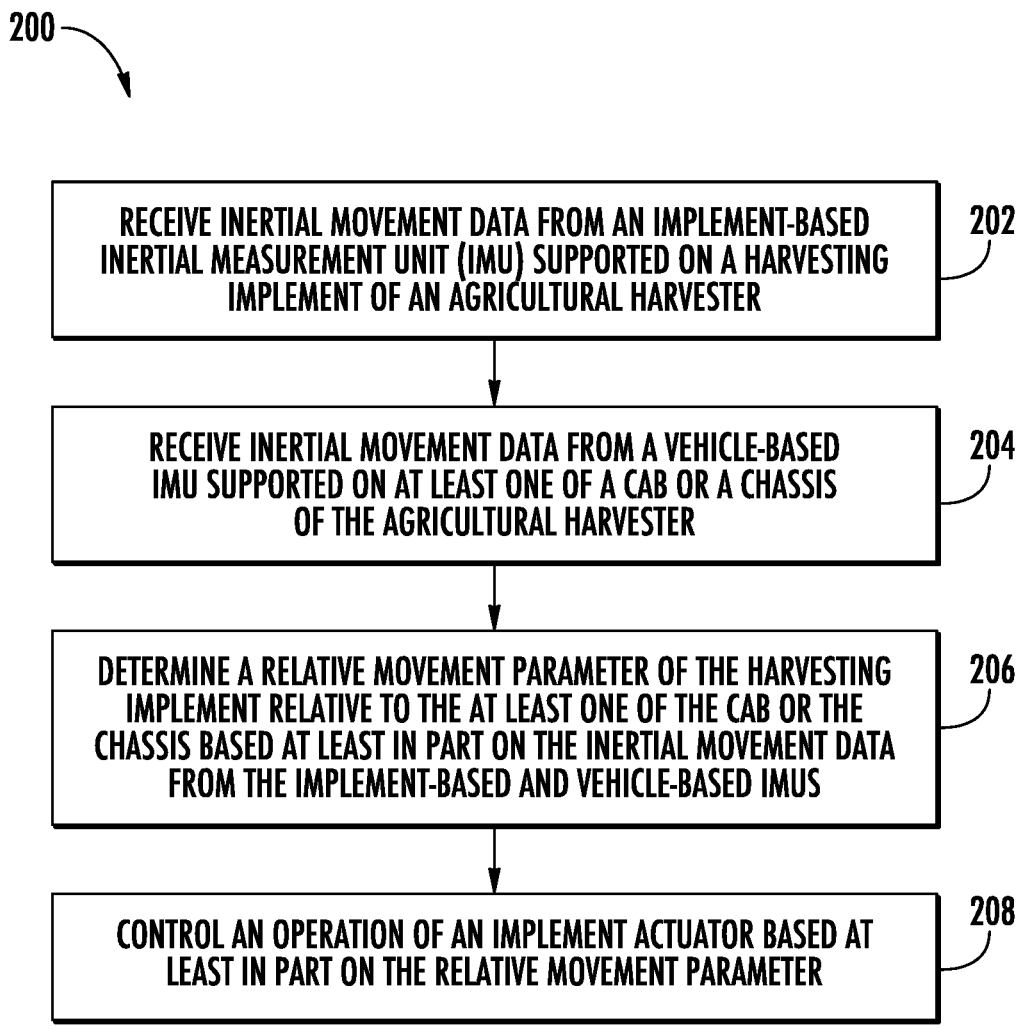
FIG. 6 illustrates a flow diagram of one embodiment of a method for automatically controlling a position of a harvesting implement of an agricultural harvester in accordance with aspects of the present subject matter.

Referring now to FIG. 6, a flow diagram of one embodiment of an agricultural method 200 for automatically controlling a position of a harvesting implement of an agricultural harvester is illustrated in accordance with aspects of the present subject matter. In general, the agricultural method 200 will be described herein with reference to the agricultural harvester 10 described with reference to FIGS. 1 and 2, and the computing system 100 described with reference to FIGS. 3-5. However, it should be appreciated that the disclosed agricultural method 200 may be implemented with agricultural harvesters 10 having any other suitable configuration, and/or with agricultural systems having any other suitable system configuration for performing the agricultural method described. In addition, although FIG. 6 depicts steps performed in a particular order for purposes of illustration and discussion, the methods discussed herein are not limited to any particular order or arrangement. One of ordinary skill in the art, using the disclosures provided herein, will appreciate that various steps of the method disclosed herein can be omitted, rearranged, combined, and/or adapted in various ways without deviating from the scope of the present disclosure.

As shown in FIG. 6, at (202), the agricultural method 200 may include receiving inertial movement data from an implement-based IMU supported on a harvesting implement of an agricultural harvester. For instance, as described above, the computing system 102 may receive inertial movement data from the implement-based IMU 94 supported on the header 32 of the agricultural harvester 10, or on at least a portion of the header 32 that is movable relative to other header components, such as on the reel 40.

Similarly, at (204), the agricultural method 200 may include receiving inertial movement data from a vehicle-based IMU supported on at least one of a cab or a chassis of the agricultural harvester. For example, as discussed above, the computing system 102 may receive inertial movement data from the vehicle-based IMU 96 supported on at least one of the cab 22 or the chassis 14 of the agricultural harvester 10.

Moreover, at (206), the agricultural method 200 may include determining a relative movement parameter of the harvesting implement relative to the at least one of the cab or the chassis based at least in part on the inertial movement data from the implement-based and vehicle-based IMUS. For instance, as discussed above, the computing system 102 may determine a relative movement parameter of the header 32 relative to the at least one of the cab 22 or the chassis 14 by comparing the accelerations of the header 32 and the cab 22 and/or the chassis 14 to determine a reactive acceleration of the cab 22 and/or the chassis 14, and/or by comparing the positions of the header 32 and the cab 22 and/or the chassis 14 to determine a position of the header 32 relative to the cab 22 and/or the chassis 14.

Additionally, at (208), the agricultural method 200 may include controlling an operation of an implement actuator based at least in part on the relative movement parameter. For example, as indicated above, the computing system 102 may control the operation of actuator(s) 41, 72, 74, 82, 84, 98 based at least in part on the reactive acceleration of the cab 22 and/or the chassis 14 and/or on the determined position of the header 32 relative to the cab 22 and/or the chassis 14.

It is to be understood that the steps of the agricultural method 200 are performed by the computing system 102 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 102 described herein, such as the method 200, is implemented in software code or instructions which are tangibly stored on a tangible computer readable medium. The computing system 102 loads the software code or instructions via a direct interface with the computer readable medium or via a wired and/or wireless network. Upon loading and executing such software code or instructions by the computing system 102, the computing system 102 may perform any of the functionality of the computing system 102 described herein, including any steps of the method 200 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural method for automatically controlling a position of a harvesting implement of an agricultural harvester, the harvesting implement being movably supported relative to a chassis of the agricultural harvester, the agricultural harvester further comprising a cab movably supported relative to the chassis, the method comprising:
   receiving, with a computing system, implement-based inertial movement data generated by an implement-based inertial measurement unit (IMU) supported on the harvesting implement;
   receiving, with the computing system, vehicle-based inertial movement data generated by a vehicle-based IMU supported on at least one of the cab or the chassis of the agricultural harvester;
   determining, with the computing system, a relative movement parameter of the harvesting implement relative to the at least one of the cab or the chassis based at least in part on:
      comparing a vehicle acceleration of the at least one of the cab or the chassis from the vehicle-based inertial movement data to an implement acceleration of the harvesting implement from the implement-based inertial movement data; and
      determining that the at least one of the cab or the chassis is experiencing a reactive acceleration based at least in part on the vehicle acceleration being opposite in direction from the implement acceleration; and
   controlling, with the computing system, an operation of an implement actuator based at least in part on the relative movement parameter.

2. The method of claim 1, wherein controlling the operation of the implement actuator based at least in part on the relative movement parameter comprises:
   adjusting a control gain to be applied by the computing system for actuator control to an adjusted control gain; and
   controlling the operation of the implement actuator based on the adjusted control gain to reduce the reactive acceleration experienced by the at least one of the cab or the chassis when moving the harvesting implement relative to the chassis.

3. The method of claim 2, wherein the implement actuator comprises one or more of a height actuator configured to adjust a vertical positioning of at least a portion of the harvesting implement relative to the chassis, a lateral tilt actuator configured to adjust a lateral tilt of the harvesting implement relative to chassis, or a fore-to-aft tilt actuator configured to adjust a fore-to-aft tilt of the harvesting implement relative to the chassis.

4. The method of claim 1, wherein the implement actuator is coupled between a forward frame of the harvesting implement and a rearward frame of the harvesting implement, the forward frame being rotationally coupled to the rearward frame, and the rearward frame being rotationally coupled to the chassis,
   wherein controlling the operation of the implement actuator based at least in part on the relative movement parameter comprises controlling the operation of the implement actuator to increase a compensation force, the compensation force reducing rotation of the forward frame relative to the rearward frame, the compensation force being selected based at least in part on a magnitude of the reactive acceleration.

5. The method of claim 1, wherein the implement-based inertial movement data comprises implement position data associated with a current implement position of the harvesting implement, and the vehicle-based inertial movement data comprises vehicle position data associated with a current vehicle position of at least one of the cab or the chassis.

6. The method of claim 5, further comprising comparing the current implement position relative to the current vehicle position to a desired position of the harvesting implement relative to the at least one of the cab or the chassis,
   wherein controlling the operation of the implement actuator based at least in part on the relative movement parameter comprises controlling the operation of the implement actuator to move the harvesting implement relative to the chassis based at least in part on the comparison of the current implement position relative to the current vehicle position to the desired position.

7. The method of claim 6, wherein the implement actuator comprises one or more of a height actuator configured to adjust a vertical positioning of at least a portion of the harvesting implement relative to the chassis, a lateral tilt actuator configured to adjust a lateral tilt of the harvesting implement relative to chassis, or a fore-to-aft tilt actuator configured to adjust a fore-to-aft tilt of the harvesting implement relative to the chassis.

8. The method of claim 1, wherein controlling the operation of the implement actuator based at least in part on the relative movement parameter comprises controlling the operation of the implement actuator based at least in part on the relative movement parameter and a distance of the harvesting implement from a ground surface.

9. An agricultural system for automatically controlling a position of a harvesting implement of an agricultural harvester, the system comprising:
- a chassis;
- a cab supported relative to the chassis;
- a harvesting implement movably supported relative to the chassis,
- an implement-based inertial measurement unit (IMU) supported on the harvesting implement, the implement-based IMU being configured to generate implement-based inertial movement data associated with the harvesting implement;
- a vehicle-based IMU supported on at least one of the cab or the chassis of the agricultural harvester, the vehicle-based IMU being configured to generate vehicle-based inertial movement data associated with the at least one of the cab or the chassis;
- an implement actuator configured to control movement of the harvesting implement; and
- a computing system configured to:
  - receive the implement-based inertial movement data and the vehicle-based inertial movement data;
  - determine a relative movement parameter of the harvesting implement relative to the at least one of the cab or the chassis based at least in part on being configured to:
    - compare a vehicle acceleration of the at least one of the cab or the chassis from the vehicle-based inertial movement data to an implement acceleration of the harvesting implement from the implement-based inertial movement data; and
    - determine that the at least one of the cab or the chassis is experiencing a reactive acceleration based at least in part on the vehicle acceleration being opposite in direction from the implement acceleration; and
  - control an operation of the implement actuator based at least in part on the relative movement parameter.

10. The system of claim 9, wherein, to control the operation of the implement actuator based at least in part on the relative movement parameter, the computing system is configured to:
- adjust a control gain to be applied by the computing system for actuator control to an adjusted control gain; and
- control the operation of the implement actuator based on the adjusted control gain to reduce the reactive acceleration experienced by the at least one of the cab or the chassis when moving the harvesting implement relative to the chassis.

11. The system of claim 10, wherein the implement actuator comprises one or more of a height actuator configured to adjust a vertical positioning of at least a portion of the harvesting implement relative to the chassis, a lateral tilt actuator configured to adjust a lateral tilt of the harvesting implement relative to chassis, or a fore-to-aft tilt actuator configured to adjust a fore-to-aft tilt of the harvesting implement relative to the chassis.

12. The system of claim 9, wherein the implement actuator is coupled between a forward frame of the harvesting implement and a rearward frame of the harvesting implement, the forward frame being rotationally coupled to the rearward frame, and the rearward frame being rotationally coupled to the chassis,
wherein, to control the operation of the implement actuator based at least in part on the relative movement parameter, the computing system is configured to control the operation of the implement actuator to increase a compensation force, the compensation force reducing rotation of the forward frame relative to the rearward frame, the compensation force being selected based at least in part on a magnitude of the reactive acceleration.

13. The system of claim 9, wherein the implement-based inertial movement data comprises implement position data associated with a current implement position of the harvesting implement, and the vehicle-based inertial movement data comprises vehicle position data associated with a current vehicle position of at least one of the cab or the chassis.

14. The system of claim 13, wherein the computing system is further configured to compare the current implement position of the harvesting implement relative to the current vehicle position of the at least one of the cab or the chassis to a desired position of the harvesting implement relative to the at least one of the cab or the chassis,
wherein, to control the operation of the implement actuator based at least in part on the relative movement parameter, the computing system is configured to control the operation of the implement actuator to move the harvesting implement relative to the chassis based at least in part on the comparison of the current implement position relative to the current vehicle position to the desired position.

15. The system of claim 14, wherein the implement actuator comprises one or more of a height actuator configured to adjust a vertical positioning of at least a portion of the harvesting implement relative to the chassis, a lateral tilt actuator configured to adjust a lateral tilt of the harvesting implement relative to chassis, or a fore-to-aft tilt actuator configured to adjust a fore-to-aft tilt of the harvesting implement relative to the chassis.

16. The system of claim 9, wherein, to control the operation of the implement actuator based at least in part on the relative movement parameter, the computing system is configured to control the operation of the implement actuator based at least in part on the relative movement parameter and a distance of the harvesting implement from a ground surface.

17. An agricultural method for automatically controlling a position of a harvesting implement of an agricultural harvester, the harvesting implement being movably supported relative to a chassis of the agricultural harvester, the agricultural harvester further comprising a cab movably supported relative to the chassis, the method comprising:
- receiving, with a computing system, implement-based inertial movement data generated by an implement-based inertial measurement unit (IMU) supported on the harvesting implement;
- receiving, with the computing system, vehicle-based inertial movement data generated by a vehicle-based IMU supported on at least one of the cab or the chassis of the agricultural harvester;
- comparing, with the computing system, a vehicle acceleration of the at least one of the cab or the chassis from the vehicle-based inertial movement data to an implement acceleration of the harvesting implement from the implement-based inertial movement data;
- determining that the at least one of the cab or the chassis is experiencing a reactive acceleration based on the comparison of the vehicle acceleration and the implement acceleration; and
- controlling, with the computing system, an operation of an implement actuator based at least in part on the reactive acceleration by:

adjusting a control gain to be applied by the computing system for actuator control to an adjusted control gain; and controlling the operation of the implement actuator based on the adjusted control gain to reduce the reactive acceleration experienced by the at least one of the cab or the chassis when moving the harvesting implement relative to the chassis.

* * * * *